May 16, 1944.　　　D. O'KEEFFE　　　2,349,109

AUTO SAFETY BELT

Filed Aug. 27, 1942

David O'Keeffe
INVENTOR.

BY
Victor J. Evans & Co.
ATTORNEYS

Patented May 16, 1944

2,349,109

UNITED STATES PATENT OFFICE 2,349,109

AUTO SAFETY BELT

David O'Keeffe, Buffalo, N. Y.

Application August 27, 1942, Serial No. 456,421

1 Claim. (Cl. 155—189)

This invention relates to an auto safety belt and has for an object to provide a device of this character which may be passed across the lap of the occupant of an automobile seat to prevent the occupant being thrown forwardly out of the seat in case of a sudden stop or collision.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figures 3, 7, 8, 9:
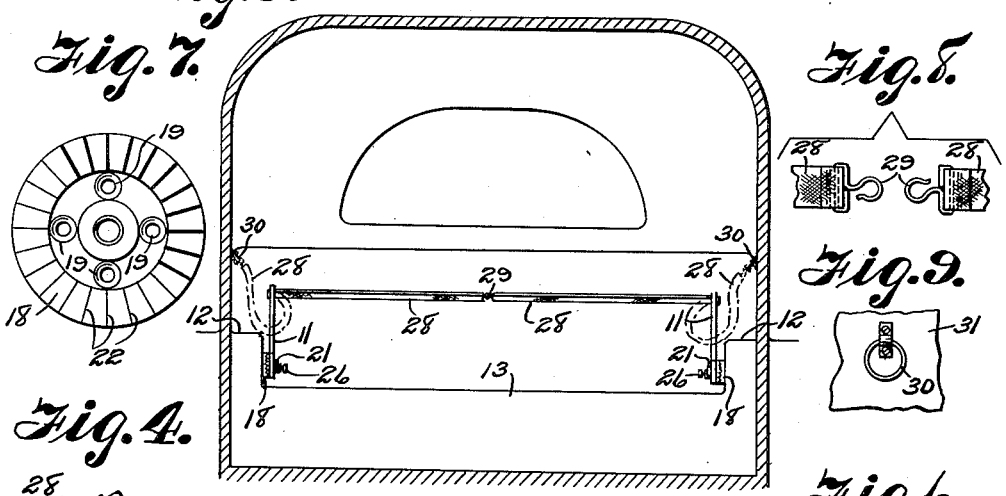
Figure 3 is a cross sectional view of the body of the automobile taken in front of the seat, and showing the belt in operative position.
Figure 7 is an inner face view of a base forming disk.
Figure 8 is a fragmentary elevational view of a pair of strap sections showing the connecting ends in separated relation.
Figure 9 is a front elevational view of a strap engaging ring.
Figure 4:
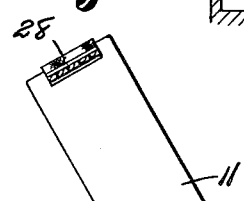
Figure 4 is a side elevation of one of the pivoted side arms of the belt.
Figure 5:
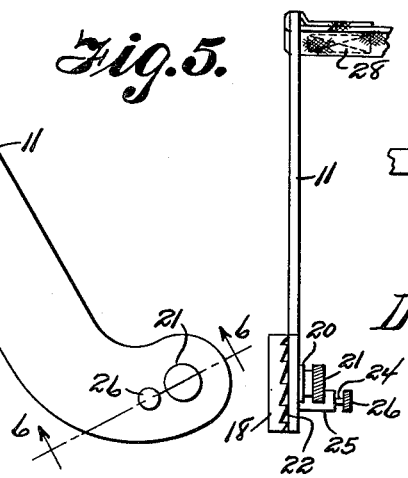
Figure 5 is a front elevation of one of the pivoted side arms, showing the belt connected through, and showing the ratchet means at the bottom of the arm for securing the arm in operative or a released position.
Figure 6:
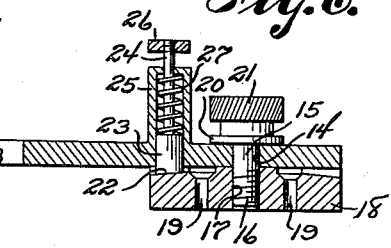
Figure 6 is a detail perspective view taken on the line 6—6 of Figure 4 showing the rachet means.

Referring now to the drawing in which like characters of reference designate similar parts in the various views, 10 designates an automobile to which the auto safety belt is shown applied by way of example. The auto safety belt comprises a pair of arms 11, each pivoted at the lower end, to the seat frame 12 which supports the seat cushion 13. The arms are curved in the same direction at the lower ends and are provided with respective openings 14 to receive a pivot pin 15 having smooth portions to pass through the openings and having a threaded portion 16, to engage in an opening 17 formed in the base member 18 of a ratchet device. The base member is in the form of a disk, as shown at Figure 7, and is secured to the said frame 12 by preferably four headed screws or nails engaged through openings 19 formed in the base member. The pivot pin is provided with a stop collar 20 and a knurled head 21, see Figure 6. The base member of the annularly arranged rachet means is provided with rachet teeth 22, which are engaged by a cylindrical pawl 23 having a reduced stem 24, slidably engaged in a casing 25 secured to the arms 11. The stem is provided outside the casing with a knob 26 and within the casing, a helical spring 27 is sleeved on the stem and bears against the pawl 23 to yieldably hold the pawl 23 engaged with the rachet teeth 22.

Figure 1:
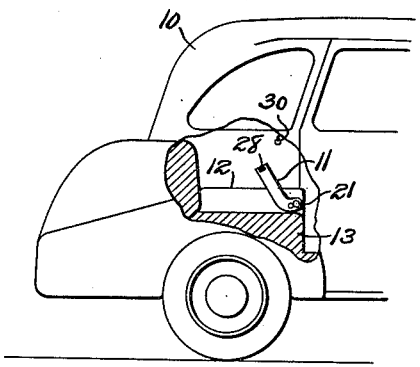
Figure 1 is a fragmentary side elevation of an automobile with a portion broken away to expose an auto safety belt constructed in accordance with the invention in operative position, the seat and the belt being shown in section.

Two strap sections 28, see Figure 3, are secured at the outer ends to the upper ends of the arms 11, in any preferred manner and are provided at the inner ends with hooks 29 adapted to be engaged with each other to hold the strap across the lap of the occupant of the seat when the arms are rocked upwardly to operative position, see Figure 1. When the hooks 29 are disengaged from each other the strap sections 11 may be directed outwardly toward the walls of the vehicles and the hooks then engaged in rings 30, see Figure 9, which are secured in any preferred manner to the walls 31 of the vehicle.

Figure 2:
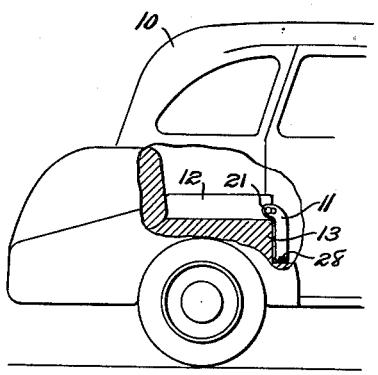
Figure 2 is a view similar to Figure 1, but showing the belt in released position.

In operation, by withdrawing the pawls 23 from the rachet teeth 22 of the bases 18, the arms 11 may be swung upwardly and then the pawls may be released to hold the arms in this position, thereupon the strap sections may be engaged across the lap of the occupant and hooked together to provide a means for preventing the occupant from being thrown forwardly in the event of a sudden stop or collision. When the device is not to be used the strap sections may be hooked with the rings 30 and the pawls 23 released to permit the arms 11 to be swung downwardly against the front side of the cushion from the position shown in Figure 1, to the position shown in Figure 2, whereupon the pawls may be applied to hold the arms in released position.

From the above description, it is thought that the invention will be fully understood without further explanation.

I claim:

A safety device for a vehicle having a seat and frame members at each side of the seat, comprising a disk adapted for connection with each frame member in a vertical position above the front top marginal portion of the seat, an annular series of teeth formed on the outer face of the disk, said disk being provided with an interiorly threaded transverse bore in its center, an arm pivotally connected with each disk for swinging movement in a plane parallel with the disk, said arm being arcuately curved at its inner end so as to assume a vertically depending position in front of the seat, the inner curved end of the arm having an opening registering with the bore of the disk, a pivot pin extending through said opening and threadedly engaging the bore in the disk, a tubular casing projecting laterally outward of the arm in registration with an opening therein, a cylindrical pawl slidably mounted in the casing and engageable with the teeth of the disk, a stem secured to the pawl and extending outwardly of the casing for manually retracting said pawl, a spring in the casing bearing against the pawl to yieldingly maintain the latter in engagement with the teeth of the disk, and strap means attached to the outer ends of said arms.

DAVID O'KEEFFE.